US007754080B2

(12) United States Patent
Hausin et al.

(10) Patent No.: US 7,754,080 B2
(45) Date of Patent: Jul. 13, 2010

(54) FIXED FILM BIOPROCESS FOR REMOVING CARBON COMPOUNDS IN OIL AND GAS DRILLING SLUDGE

(75) Inventors: Volker A. Hausin, Rochester, NY (US); Eddie L. Cheatham, Colleyville, TX (US); David A. Wilson, Rhome, TX (US)

(73) Assignee: TVT US Corporation, Rochester, NY (US)

( * ) Notice: Subject to any disclaimer, the term of this patent is extended or adjusted under 35 U.S.C. 154(b) by 208 days.

(21) Appl. No.: 12/062,339

(22) Filed: Apr. 3, 2008

(65) Prior Publication Data

US 2008/0251449 A1 Oct. 16, 2008

Related U.S. Application Data

(60) Provisional application No. 60/909,954, filed on Apr. 4, 2007.

(51) Int. Cl.
*C02F 3/02* (2006.01)
(52) U.S. Cl. .................. 210/603; 210/615; 210/620; 210/150; 210/259; 210/908; 435/262
(58) Field of Classification Search .......... 210/603, 210/610, 611, 614–618, 620, 621, 150, 151, 210/194, 252, 259, 908; 175/206; 435/262, 435/262.5
See application file for complete search history.

(56) References Cited

U.S. PATENT DOCUMENTS

| 4,035,289 | A | * | 7/1977 | Guillerme et al. ........... 210/610 |
| 4,851,123 | A | | 7/1989 | Mishra |
| 4,985,131 | A | | 1/1991 | Lane |
| 5,132,025 | A | * | 7/1992 | Hays ........................ 210/758 |
| 5,271,845 | A | | 12/1993 | Paquin |
| 5,635,392 | A | * | 6/1997 | Kopp-Holtwiesche et al. ....................... 435/253.6 |
| 5,656,169 | A | | 8/1997 | Lugowski et al. |
| 6,022,476 | A | | 2/2000 | Hausin |
| 6,231,766 | B1 | | 5/2001 | Hausin |
| 6,395,173 | B1 | | 5/2002 | Jordenskjold |
| 6,488,854 | B2 | | 12/2002 | O'Leary et al. |
| 6,613,720 | B1 | * | 9/2003 | Feraud et al. ............... 507/200 |
| 6,652,752 | B2 | * | 11/2003 | Ward et al. .................. 210/610 |
| 6,821,426 | B1 | | 11/2004 | Hausin et al. |
| 6,823,238 | B1 | | 11/2004 | Hensley et al. |
| 6,837,997 | B2 | | 1/2005 | Wilkinson |
| 6,955,222 | B2 | | 10/2005 | Lien |

(Continued)

*Primary Examiner*—Fred Prince
(74) *Attorney, Agent, or Firm*—George R. McGuire; Bond Schoeneck & King, PLLC

(57) ABSTRACT

A system for recycling drilling sludge is disclosed. The system has a treatment area and a salt-tolerant bio-reactor coupled to the treatment area. The bio-reactor has i) at least one bio-suspension element for supporting the growth of at least one type of biological microorganism within an enclosed flow zone; ii) an agitator for creating a flow of the drilling sludge through the enclosed flow zone at a flow rate; and iii) an aerator for providing a gas to the enclosed flow zone. The system also has a processor coupled to the agitator and configured to create at least a minimum self-cleaning drag force between drilling sludge passing through the enclosed flow zone and the combined at least one type of biological microorganism and the at least one bio-suspension element. A related method and bio-reactor are also disclosed.

52 Claims, 9 Drawing Sheets

U.S. PATENT DOCUMENTS

| | | |
|---|---|---|
| 7,101,483 B2 | 9/2006 | Hausin et al. |
| 2002/0096472 A1 | 7/2002 | Smith et al. |
| 2003/0085172 A1 | 5/2003 | Yamasaki et al. |
| 2005/0051482 A1* | 3/2005 | Austin ........................ 210/619 |
| 2007/0056913 A1 | 3/2007 | Burt |

* cited by examiner

FIXED FILM BIOPROCESS FOR REMOVING CARBON COMPOUNDS IN OIL AND GAS DRILLING SLUDGE

RELATED APPLICATIONS

This application claims priority to U.S. provisional patent application 60/909,954 entitled, "FIXED FILM BIOPROCESS FOR REMOVING CARBON COMPOUNDS IN OIL AND GAS DRILLING SLUDGE", and which was filed on Apr. 4, 2007. The entire specification of U.S. provisional patent application 60/909,954 is hereby incorporated by reference in its entirety.

FIELD

The claimed invention relates to fixed film bioprocesses, and more specifically to a fixed film bioprocess for removing carbon compounds in oil and gas drilling sludge.

BACKGROUND

Drilling technology has progressed to a highly robust level such that it is possible to reach petroleum, oil, or natural gas deposits which are 35,000 feet or more below the earth's surface. Such long shafts may also be used with a drilling process which deviates by design from a vertical path to reach hydrocarbons which are situated below locations which are either difficult to place a drilling rig on, populated, or environmentally sensitive. Unfortunately, despite improved drilling capability and the environmentally helpful flexibility in selecting a drilling location which such new technology affords, there are still facets of the drilling process which could be improved to reduce their impact on the environment.

Existing oil and gas drilling processes can take as little as two weeks, but the environmental impact may last for years. FIG. 1 schematically illustrates a typical existing oil or gas drilling process. A drilling rig 30 drives a drill bit 32 into the earth, aided by rotary torque and the compressive weight of drill extensions 34 and drill collars 36 above it. A drill pipe 38 is fed along with the drill bit 32 as it advances into the earth. Water is pumped down 40 the inside of the drill pipe 38 and exits 42 at the drill bit 32, helping to break up the rock, keep pressure on top of the bit 32, as well as cleaning, cooling, and lubricating the drill bit 32. Drilling debris is swept up 44 by the drilling water as it circulates back to the surface outside the drilling pipe. The water used for drilling can be industrial or potable water and depending on the location of the drilling site, the water may be supplied by a temporary connection to a municipal water supply, a well, or a reservoir. The drilling water may also be supplied by transporting the water to the drilling site in barrels and storing it on-site in a storage container 46 until needed.

The drilling fluid which returns to the surface is often referred-to as "mud" or "sludge", and may contain a wide variety of contaminants. In addition to materials such as rock and sand, there are a variety of hydrocarbons such as oil and petroleum present in the drilling fluid. There is often a high salt content of the drilling fluid which returns to the surface due to the earth's composition where the drilling takes place. The salt content of the drilling fluid can often be near or even higher than an average salinity found in the ocean. (approximately 35 parts per thousand). Furthermore, the drilling sludge has been found to contain toxins and heavy metals which also contaminate the sludge.

A common practice to deal with the drilling sludge is to package the sludge in barrels 48 for transport to and disposal of in another location. When the two-week drilling process has concluded, the well can be capped-off and the area around the well may show little impact of the drilling team and equipment which were once there for a short time. However, there is still the drilling sludge to consider. The average drilling process can generate 300,000 barrels of sludge per day over a two week period, or the equivalent of 4,200,000 barrels of sludge for each drilled well. The sludge in these barrels is commonly disposed-of by returning it below the earth's surface by means of an insertion well, which unfortunately has the potential to pollute an area of land around the insertion well, in addition to possibly contaminating ground water supplies in the area.

Some drilling companies try to alleviate the environmental impact of sludge disposal by running the sludge through reverse osmosis filters to reclaim some of the water. Unfortunately, the reverse osmosis filters are limited to reclaiming only about 50% of the water which was originally used in the drilling process, the hydrocarbons in the sludge quickly plug-up the membranes of the reverse osmosis filters, and the remaining sludge is still disposed of in an insertion well or otherwise buried in the ground where it can pollute the land and the groundwater.

Other drilling companies have set-up treatment areas for oil-based components such that the oil based components are in the treatment area with added microorganisms which are seeded into the oil. While there certainly exist microorganisms which like to feast on oils, simply seeding the drilling sludge and allowing the microorganisms to float around in the sludge does not provide consumption of the oil at a rate which will make an impact on reducing the oil. While aeration may help such a seeded oil setup, the microorganisms will quickly become mature and their consumption rate slows down even further. It is common to find prior art oil treatment areas using microorganisms where the treatment areas are either stagnant, or had gentle mixing flows. For example, as noted in U.S. Pat. No. 5,228,998 which discloses a method of using biological microorganisms to remove selected biodegradable materials from a pond, heavy turbulence of the input stream is intentionally avoided . . ." (see col. 2, lines 64-65) and that "our invention achieves the biological activity that it uses to reduce pollutants by specifically avoiding uncontrolled turbulence in water being treated . . ." (see col. 2, lines 31-34). Unfortunately, devices like the one referred to in the '998 patent often tend to become clogged due to uncontrolled microorganism growth, and even when they are not clogged, they are not very efficient. The '998 patent also teaches that a flow rate of greater than 0.5 feet per minute will lead to disastrous results.

Therefore, it is desirable to have a method and system which can be used to treat the diverse components of the drilling sludge liquid in such a way as to substantially render the components harmless in an efficient, cost-effective, and environmentally friendly way.

SUMMARY

A method of recycling drilling sludge is disclosed. The drilling sludge is directed to a treatment area. The drilling sludge is passed from the treatment area through a salt-tolerant bio-reactor to reduce oil, sludge, and carbon compounds to produce remaining wastewater. Salt is removed from the remaining wastewater.

A system for recycling drilling sludge is also disclosed. The system has a treatment area. The system also has a salt-tolerant bio-reactor, coupled to the treatment area. The bio-reactor has i) at least one bio-suspension element for supporting the growth of at least one type of biological microorganism within an enclosed flow zone; ii) an agitator for creating a flow of the drilling sludge through the enclosed flow zone at a flow rate; and iii) an aerator for providing a gas to the enclosed flow zone. The system also has a processor coupled to the agitator and configured to create at least a minimum self-cleaning drag force between drilling sludge passing through the enclosed flow zone and the combined at least one type of biological microorganism and the at least one bio-suspension element.

A bio-reactor is further disclosed. The bio-reactor has at least one bio-suspension element for supporting the growth of at least one type of biological microorganism within an enclosed flow zone. The bio-reactor also has an agitator for creating a flow of a bio-food through the enclosed flow zone at a flow rate. The bio-reactor further has an aerator for providing a gas to the enclosed flow zone. The bio-reactor also has a processor coupled to the agitator and configured to create at least a minimum self-cleaning drag force between bio-food passing through the enclosed flow zone and the combined at least one type of biological microorganism and the at least one bio-suspension element.

Figure 1:
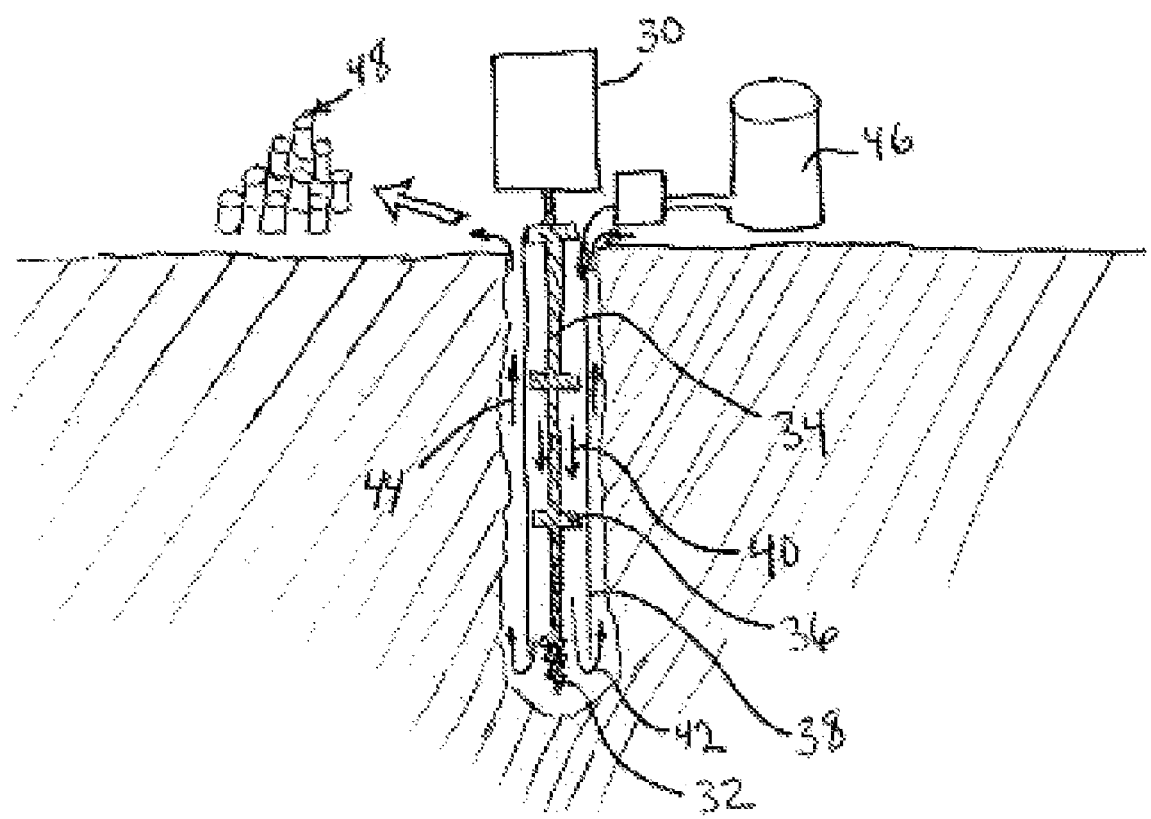
FIG. 1 is a schematic illustration of one embodiment of an oil or gas drilling process.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

Figure 2:
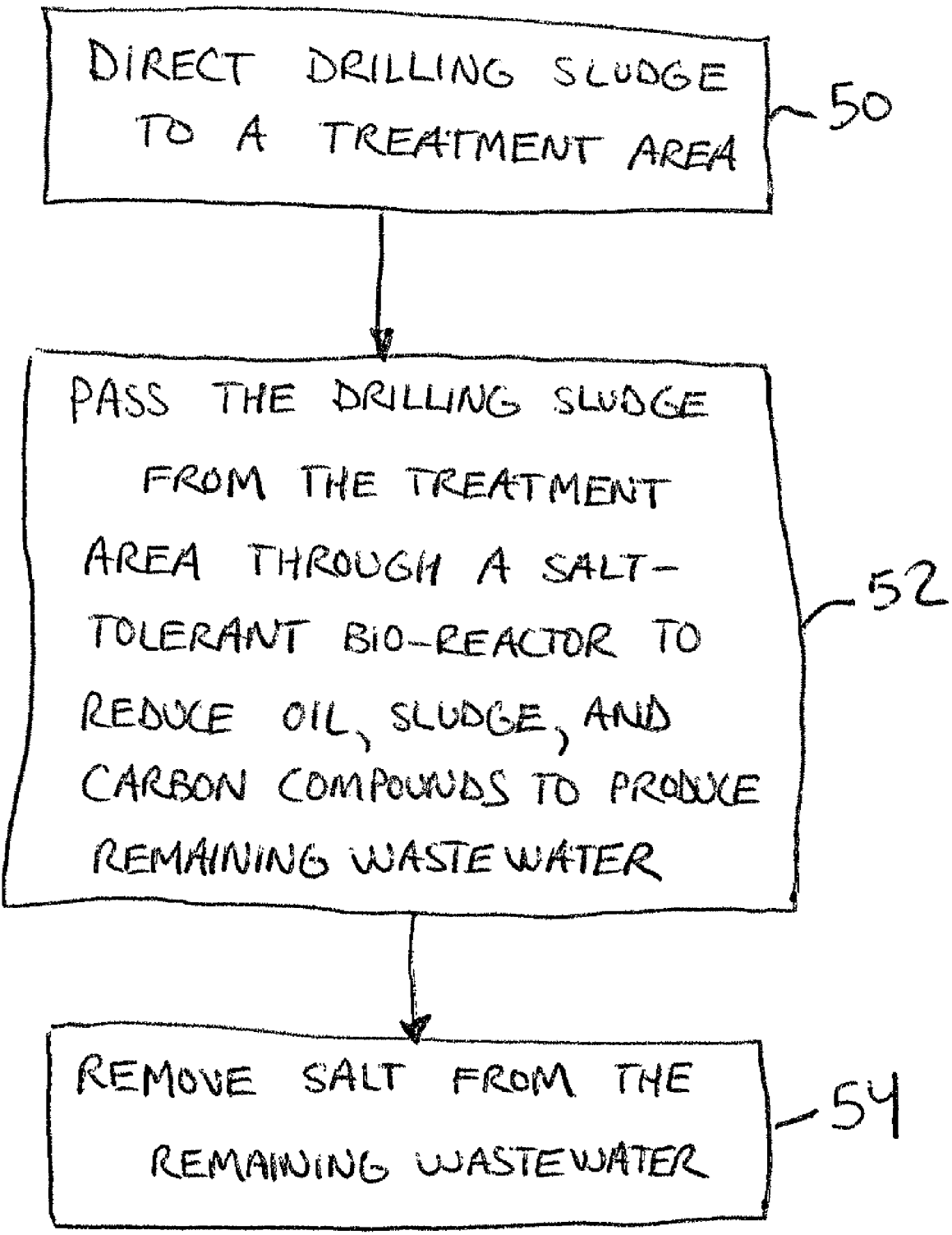
FIG. 2 illustrates one embodiment of a method of recycling drilling sludge.

FIG. 2 illustrates one embodiment of a method of recycling drilling sludge. Drilling sludge, as previously described, is produced by drilling sites at astounding rates. In some cases, 300,000 barrels of sludge are produced on a daily basis at a drilling site. The drilling sludge needs to be directed 50 to a treatment area. The claimed invention can accommodate the existing step of filling the sludge into barrels, delivering the barrels to a remote treatment area, and dumping the sludge into the treatment area. Due to the speed of the claimed invention in recycling the sludge, however, in some embodiments, directing the drilling sludge to a treatment area may mean pumping the sludge to the treatment area without having to fill it in barrels. There is great flexibility in where the treatment area can be, since all of the steps in this process are portable.

The treatment area may be any body of water or fluid containment area, provided that the treatment area is isolated from the ground so that the harmful materials in drilling sludge may not re-enter the ground. Suitable examples of a treatment area include, but are not limited to a lined lagoon, a floating bladder (sometimes convenient for offshore drilling rigs) a land-based bladder, a lined pond, a lined lake, and a storage tank. The treatment area may be sloped to help accumulate some of the inert solids from the drilling sludge, such as rock chips, which will naturally fall to the bottom of the treatment area.

The drilling sludge is passed 52 from the treatment area through a salt-tolerant bio-reactor to reduce oil, sludge, and carbon compounds to produce remaining wastewater. It is important to note that in this embodiment, no microorganisms of any kind are added to the drilling sludge. The bio-reactor in this embodiment does not have pre-existing microorganisms which are selected for their ability to feast on oils. Microorganisms, such as bacteria, yeast, microbes, and fungi are naturally occurring, and although they will not naturally be found in sludge in high concentrations, there will be a small number of oil-loving microorganisms in the sludge as it has come out of the ground. The number of oil loving microorganisms is so small, however, that if just left to sit in the sludge, these microorganisms would not make a noticeable impact on the present hydrocarbons. In contrast, by passing 52 the drilling sludge through the salt-tolerant bio-reactor, the conditions for optimizing the growth of the existing microorganisms may be created.

In order to help optimize the growth of the micro-organisms (existing otherwise), the bioreactor is provided with at least one bio-suspension element for supporting the growth of at least one type of biological microorganism. Different embodiments may have different numbers of bio-suspension elements, from man-made shapes having large surface area to naturally occurring sand. The one or more bio-suspension elements provide surfaces with increased water tension which the microorganisms like to settle on and grow into a biological film over time.

Many types of microorganisms are always around us, though only some will be thriving in a given location at a particular time. This is because the different types of microorganisms have different types of food they like to eat and will thrive in relation to the food which is available, provided optimal conditions for growing are present, such as a large surface area to grow on and generous amounts of oxygen for aerobic bacteria. Therefore, the bio-reactor also has an aerator to provide oxygen to the microorganisms.

Furthermore, the bio-reactor has an agitator which creates a flow of drilling sludge through the bio-reactor. Some suitable examples of agitators include, but are not limited to, a propeller, an impeller, a water jet, and a venturri eductor. The flow created by the agitator is directed through an enclosed flow zone so that a pressure may be created within the enclosed flow zone. Depending on the characteristics of the enclosed flow zone, such as cross-section, backpressure, agitator rate, bio-suspension element attributes, a particular pressure will be created in the enclosed flow zone for a given rate of agitation. Since one flow rate on one type of bio-reactor may not be sufficient on another type of bio-reactor, it is believed that rather than specifying a flow through the filter, that at least a minimum self-cleaning drag force must be created between the drilling sludge passing through the enclosed flow zone and the combined at least one biological microorganism and the at least one bio-suspension element. The minimum-self cleaning drag force is one which will slough-off mature media from the bio-suspension elements and out of the bio-reactor before they grow too large, reduce the available growth surface area, and slow down their metabolic rate. If the drag force is too low, then the micro-organisms will grow visibly thick and clog the bio-reactor.

By recycling the drilling sludge through the bio-reactor, a colony of oil-loving micro-organisms will begin to grow on the bio-suspension elements, and in approximately three months, there will be sufficient micro-organisms present in the bio-reactor to consume the oil products. The process of growing the micro-organisms can be speeded up by introducing one or more microorganisms into the bio-reactor, but this is not absolutely necessary. Once the oil and hydrocarbon products have been removed from the drilling sludge to produce a remaining wastewater, salt is removed 54 from this remaining wastewater. As mentioned previously, the salt present in the ground and areas of the earth where oil or gas drilling is done causes the drilling sludge to have a high salt content. Therefore, before using the reclaimed water to irrigate, feed animals, or return for human consumption, the salt must be removed 54.

Figure 3:
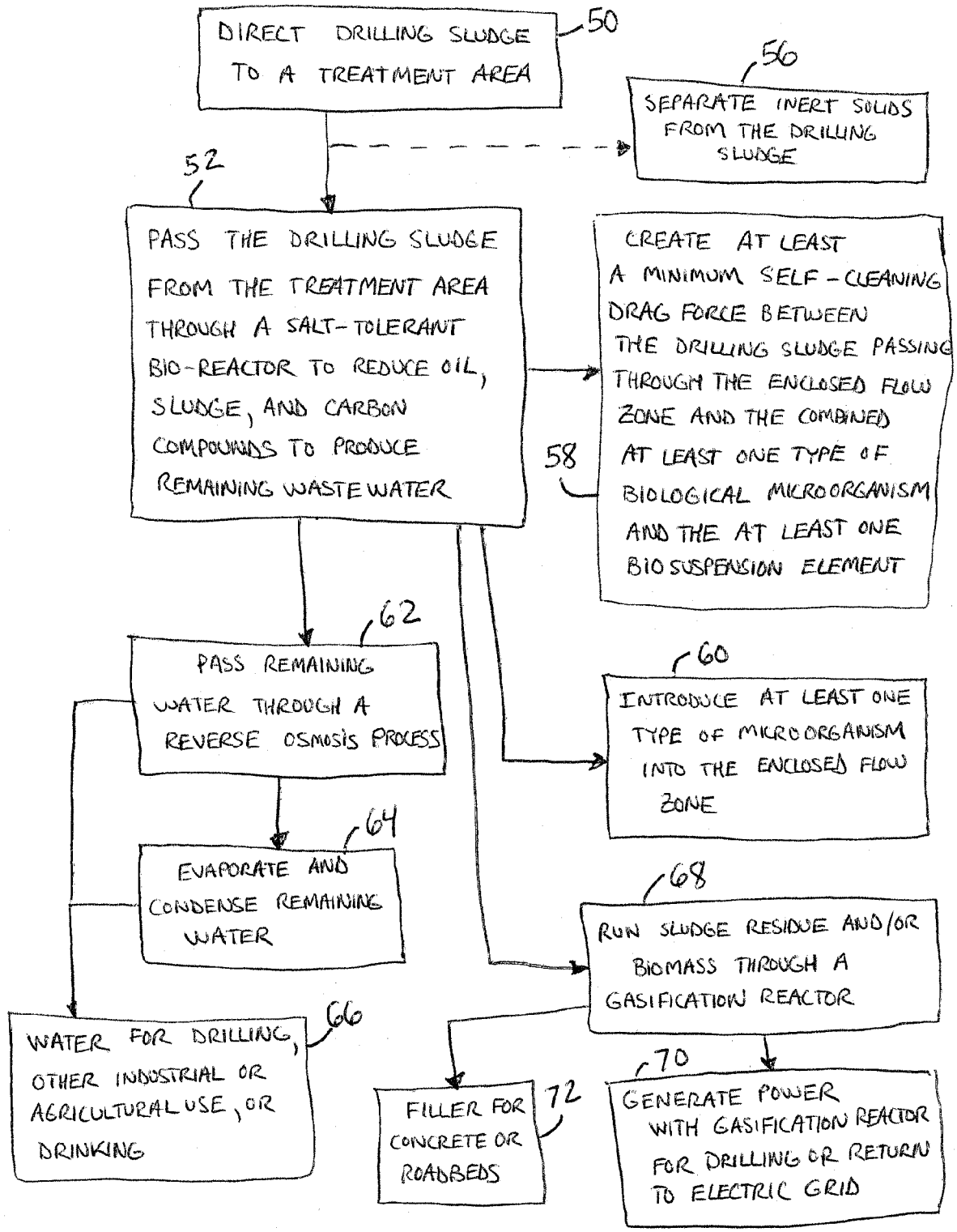
FIG. 3 illustrates another embodiment of a method of recycling drilling sludge.

FIG. 3 illustrates another embodiment of a method for recycling drilling sludge. As before, the drilling sludge is directed 50 to a treatment area. Optionally, inert solids are separated 56 from the drilling sludge, either with screens or by shaping the treatment area such that the inert solids have a place to settle towards on the bottom of the treatment area. As described above, the drilling sludge is passed 52 from the treatment area through a salt tolerant bio-reactor to reduce oil, sludge, and carbon compounds to produce remaining wastewater. It is preferred to create at least a minimum self cleaning drag force 58 between the drilling sludge passing through the enclosed flow zone and the combined at least one type of biological microorganism and the bio-suspension element. The necessary drag force will vary (based on the dimensions of the bio-reactor and the age of the microorganisms growing in a fixed film on the bio-suspension elements), but it can be determined easily without undue experimentation as the bio-film can be monitored visually after growing under a variety of drag force conditions to see how much force is necessary to prevent build-up.

Although the bio-reactor will act as an incubator for the microorganisms which are already present in the drilling sludge, it may be desirable in some embodiments to introduce 60 at least one type of microorganism into the enclosed flow zone. The bio-reactor brings the food to the microorganisms and can sustain much larger colonies of microbacteria, and at higher growth rates, than if the microorganisms had to find the food. There are many naturally occurring microorganisms which have been procured and stored in the American Type Culture Collection. Those skilled in the art know that they can go to the American Type Culture Collection, look-up a microorganism which is known to feed on the type of waste desired, and can purchase a supply of the microorganisms for dispersal within the enclosed flow zone in order to jump-start the bio-reactor. Purchasing a pre-grown collection of micro-organisms can save a significant amount of treatment time for the end user. For example, a bioreactor which is introduced to pre-grown collections of microorganisms may have a complete bio-film of microorganisms on the bio-suspension element after only a couple of days, as opposed to waiting for months for the bio-reactor to be ready.

Once the bio-reactor is running and the remaining wastewater is produced 52, it is desirable to reclaim the water for industrial, agricultural, or human consumption. In the embodiment of FIG. 3, the remaining wastewater is passed 62 through a reverse osmosis filter. The reverse osmosis filter can reclaim approximately 45% of the water as clean, potable water, but there still remains the other 55% of water mixed with the salt and possibly heavy and harmful metals, such as arsenic, barium, cadmium, lead, mercury, selenium, and silver. In order to reclaim a significant portion of the remaining water, the step to evaporate and condense 64 the remaining water is included to distill the remaining water, leaving the salts, heavy metals, and other toxins behind. This evaporation step 64 will be discussed in more detail later in the patent application. Alternatively, in other embodiments, the reverse osmosis filtering 62 could be skipped entirely and replaced with a system which exclusively uses the evaporation method on the remaining water. Regardless of which method is used, for the salt removal, the water which is reclaimed may be used 66 for drilling, other industrial or agricultural use, or even drinking.

Other by-products of the bio-reactor process may include sludge residue and/or biomass. These by products may be run through a gasification reactor 68. The gasification reactor operates at high temperature and high pressure, and typically has low emissions, including water, $CO_2$, and nitrates. The gasification process 68 can be used to generate power 70. This power can be used for more drilling, or can be returned to the electric grid. The waste product of the gasification reactor is glass. This is beneficial, because any toxins which were present in the sludge residue will come out of the gasification reactor sealed in glass, thereby making it possible to use the glass beads in the ground or in construction without fear that the toxic elements will enter the environment. As a result, the glass can be used as filler for concrete or roadbeds 72.

Figure 4:
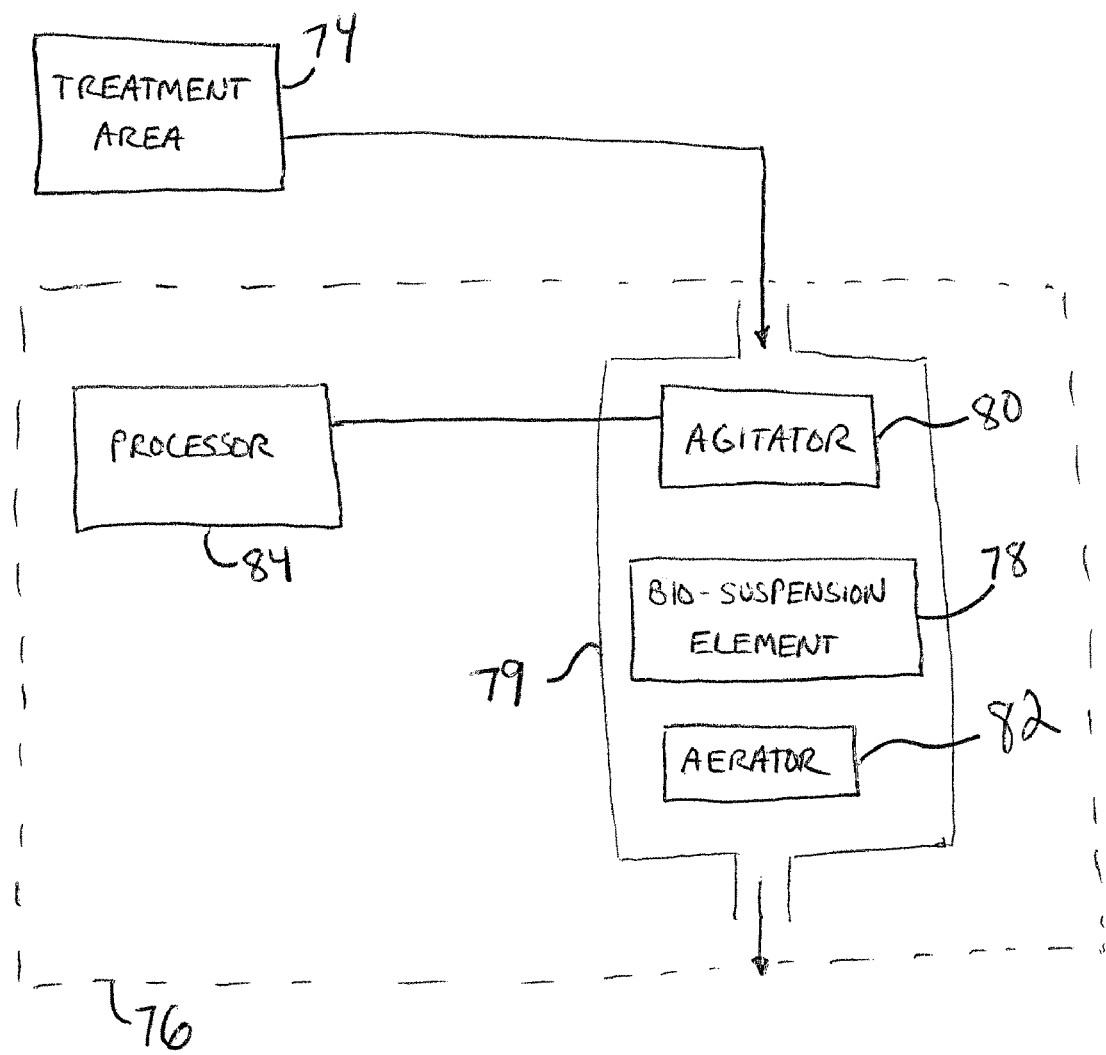
FIG. 4 schematically illustrates one embodiment of a system for recycling drilling sludge.

FIG. 4 schematically illustrates an embodiment of a system for recycling drilling sludge. The system has a treatment area 74 which the drilling sludge is directed into as described above. The system also has a salt-tolerant bio-reactor 76 coupled to the treatment area. The bio-reactor 76 has at least one bio-suspension element 78 for supporting the growth of at least one type of biological microorganism within an enclosed flow zone 79. The flow zone 79 is enclosed to enable the creation of a pressure within the flow zone 79. The bio-reactor 76 also has an agitator 80 for creating a flow of the drilling sludge through the enclosed flow zone 79 at a flow rate. A suitable example of an agitator 80 for one embodiment of a bio-reactor may be found in U.S. Pat. No. 6,022,476, the specification of which is hereby incorporated by reference. The bio-reactor 76 further has an aerator 82 for providing a gas to the enclosed flow zone 79. Again, see U.S. Pat. No. 6,022,476 for an example of a suitable aerator 82. The bio-reactor 76 also has a processor 84 coupled to the agitator 80 and configured to create at least a minimum self-cleaning drag force between drilling sludge passing through the enclosed flow zone 79 and the combined at least one type of biological microorganism and the at least one bio-suspension element 78. The processor 84 may be a microprocessor, a computer, an application specific integrated circuit (ASIC), analog electronics, digital electronics, or any combination thereof.

Figure 5:
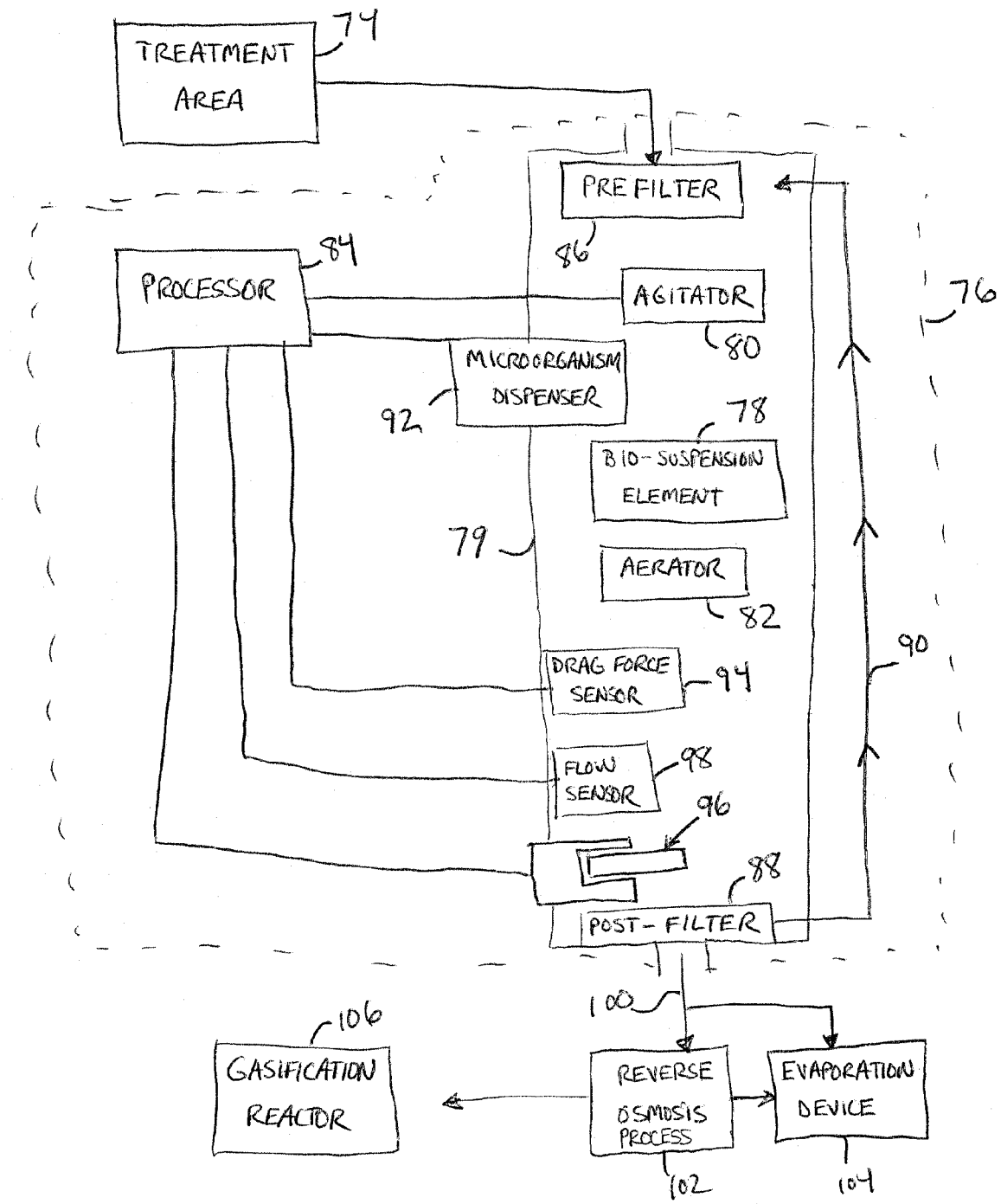
FIG. 5 schematically illustrates another embodiment of a system for recycling drilling sludge.

FIG. 5 schematically illustrates another embodiment of a system for recycling drilling sludge. As in the previous embodiment, this embodiment has a treatment area 74 which is coupled to a bio-reactor 76. The bio-reactor 76 has an agitator 80, at least one bio-suspension element 78, and an aerator 82 which are located within an enclosed flow zone 79. In this embodiment, the bio-reactor 76 also has a pre-filter 86 for removing large solids and a post filter 88 for separating hydrocarbons which still have not been digested by the microorganisms. The post-filter 88 also has a feedback path 90 for returning the undigested hydrocarbons, sludge, or oil to the bio-reactor 76. As previously discussed, it may be beneficial in some embodiments to introduce micro-organisms to the bio-reactor 76 in order to speed up the establishment of the bio-film filter. This embodiment has a microorganism dispenser 92 which is coupled to the processor 84 and which may be triggered to dispense one or more types of microorganisms into the bio-reactor 76 at desired intervals. This embodiment also provides a drag force sensor 94 for measuring the drag force within the enclosed flow zone 76. The drag force can be changed in several ways in this embodiment. First, the processor 84 can instruct the agitator 80 to increase the flow rate. The flow, combined with the characteristics of the enclosed flow zone 79 will determine the drag force. Having a drag force sensor 94 enables the processor 84 to determine the actual drag force for assistance in calibrating the minimum self-cleaning drag force. A second way to change the drag force is to change the position of the cross-sectional area adjuster 96. This device can be a louver which pivots within a tube following an attached motor response, similar to an air damper, or it can be a solenoid activated device which positions a element less or more into the flow path. Other designs for a cross-sectional area adjuster will be apparent to those skilled in the art and are intended to be covered by the scope of this specification. By decreasing the cross-sectional area for a given flow rate, the drag force will be increased. Similarly, by increasing the cross-sectional area for a given flow rate, the drag force can be decreased. A flow sensor 98 may also be provided as more feedback to the processor 84. Other embodiments will have different combinations of sensors 94, 98 and actuators 80, 96.

Remaining water 100 which passes from the bio-reactor may be passed through a reverse osmosis filter 102 and/or an evaporation device 104. Remaining sludge residue and biomass can be passed to a gasification reactor 106 as described above.

Figure 6C:
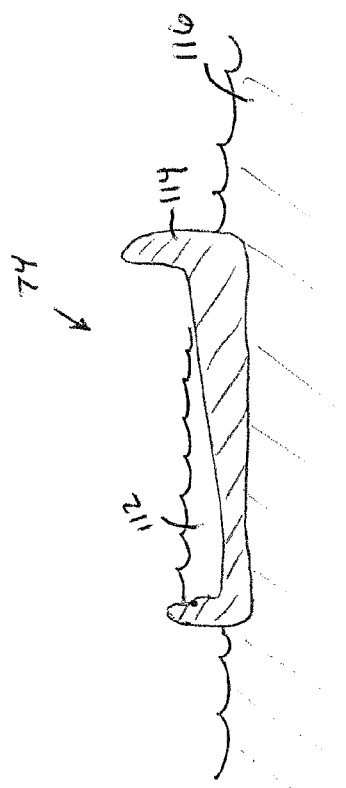
FIGS. 6A-6D schematically illustrate embodiments of treatment areas for a drilling sludge recycling process.
Figure 6D:
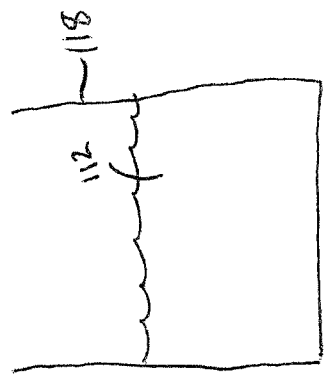
Figure 6A:
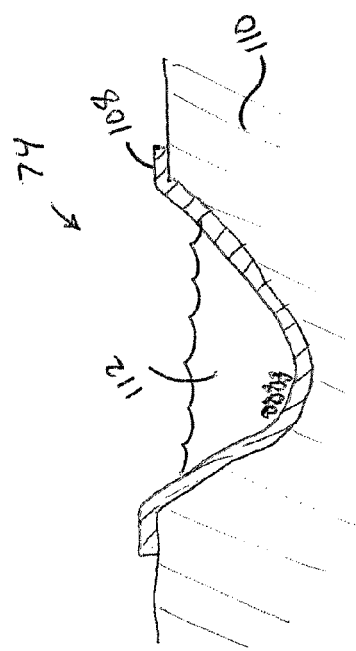
Figure 6B:
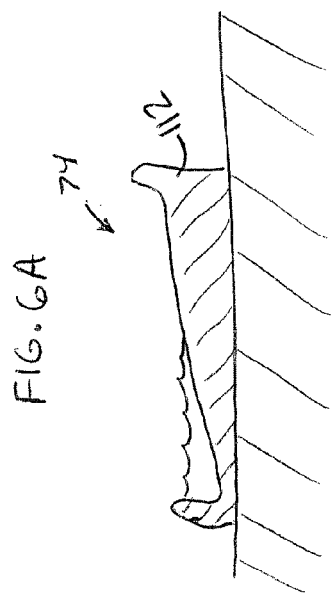

FIGS. 6A-6D schematically illustrate embodiments of treatment areas 74 which may be used with the claimed invention. In the embodiment of FIG. 6A, the treatment area is a lagoon, a lined pond, or a lined lake. The lining 108 protects the ground 110 from being contaminated by the drilling sludge 112 which is sent to the treatment area 74. The treatment area 74 may advantageously have or be dug to have sloped sides which help pool the larger, inert debris into the low-point of the treatment area. In the embodiment of FIG. 6B, the treatment area 74 is a land-based bladder 112. The bladder can be portable, and possibly inflatable in some embodiments. A slope can be built-in to facilitate gathering of the large solids as discussed above. In the embodiment of FIG. 6C, the treatment area is a floating bladder 114. Such an embodiment can be useful near an oil or gas drilling rig which is located off-shore. The sludge 112 can be kept isolated from the clean water 116 by the bladder 114 until the recycling process has been completed. In other embodiments, the land-based bladder 112 or the floating bladder 114 could be heated to allow the recycling process to take place in frigid environments. In the embodiment of FIG. 6D, the treatment area 74 is a storage tank 118. The tank 118 could be portable or fixed, depending on the embodiment.

Figure 7A:
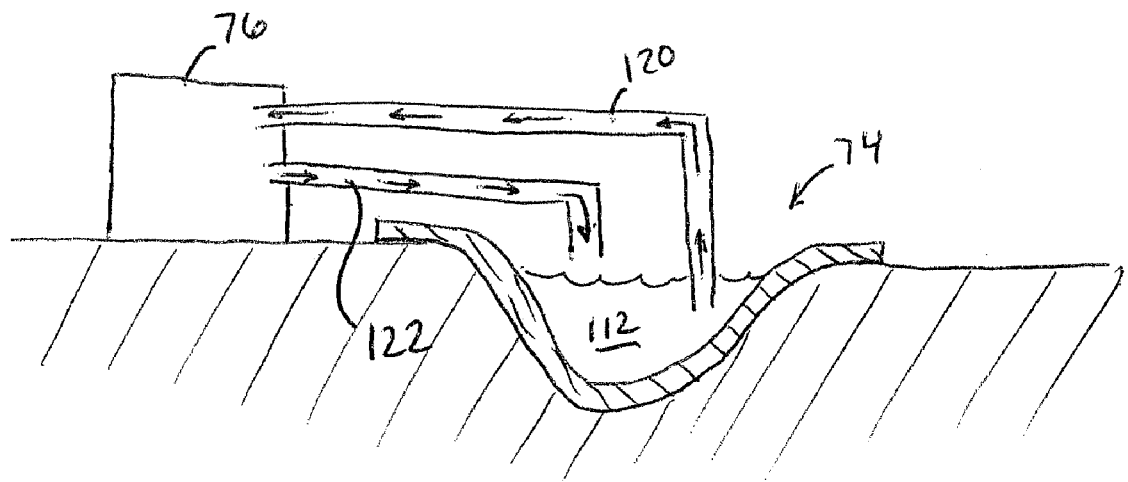
FIGS. 7A-7B schematically illustrate embodiments of bio-reactor placement for a system for recycling drilling sludge.
Figure 7B:
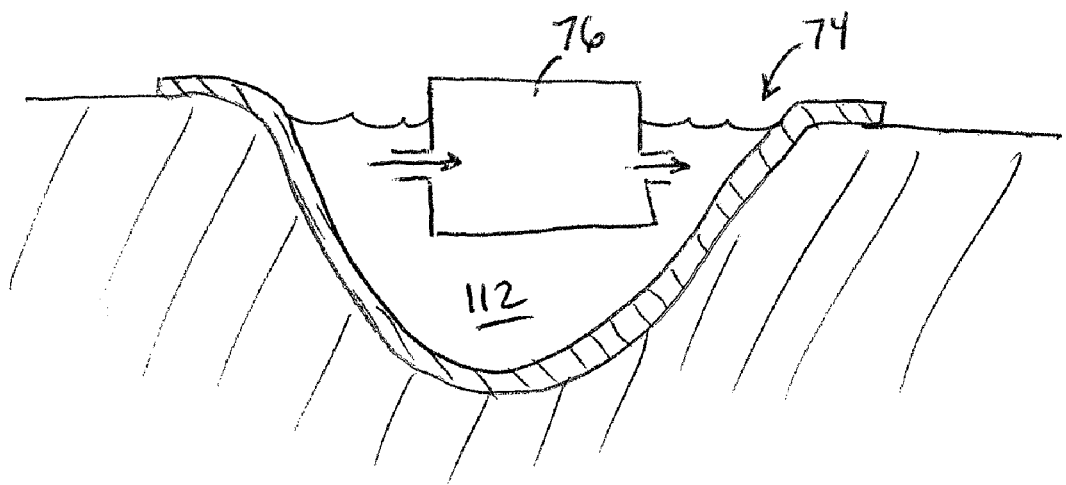

FIGS. 7A and 7B schematically illustrate that different embodiments of systems to recycle drilling sludge can have bio-reactors in different locations relative to the treatment area 74. In the embodiment of FIG. 7A, the bio-reactor 76 is located outside of the drilling sludge 112 on land. An input pipe 120 fluidically couples the bio-reactor 76 to the drilling sludge 112, while an output pipe 122 provides a fluid path to return the remaining water back to the treatment area 74. In the embodiment of FIG. 7B, the bioreactor 76 is located at least partially within the drilling sludge 112.

Figure 8A:
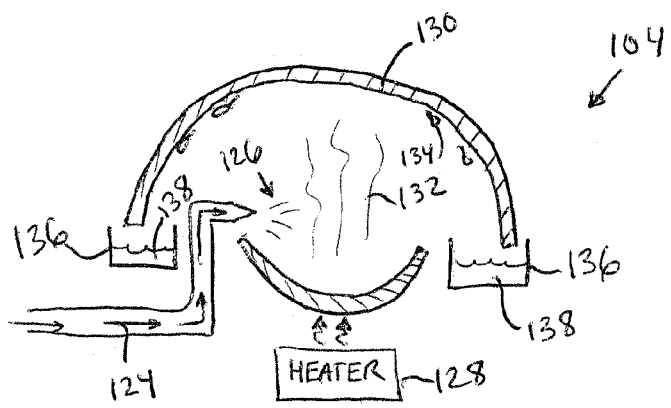
FIGS. 8A-8D schematically illustrate embodiments of evaporation devices for use in a system for recycling drilling sludge.

FIGS. 8A-8D schematically illustrate embodiments of evaporation devices 104 which have been discussed above as providing further means to reclaim potable drinking water from the remaining water from the bio-reactor by removing the salt and other toxin content. In the embodiment of FIG. 8A, remaining water 124 is pumped into the evaporation device 104 and sprayed 126 into the interior of the evaporation device 104. A heater 128 creates a suitable temperature for evaporation within the interior of the evaporation device. In other embodiments, the heater could be supplanted or replaced by using the heat from the sun. An upper clamshell 130 is situated above the evaporating water 132, and provides a surface for the water to condense 134 on. The condensed water then drips down the inside of the upper clamshell 130 into gutters 136 on either side of the clamshell 130. The water 138 which collects in the gutters does not have the salt or toxins in it and may be reclaimed as potable water or used again in the drilling process or in some other industry.

Figure 8B:
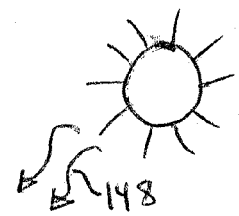
Figure 8B:
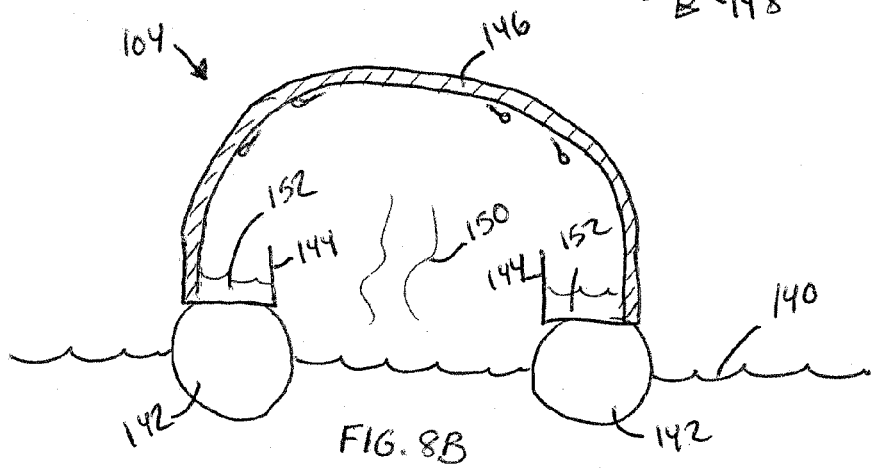

In the embodiment of FIG. 8B, the evaporation device is floating on top of the remaining water 140 using floats 142. Gutters 144 are mounted on the floats 142 and support an upper clamshell 146. The clamshell 146 is preferably constructed of a material which will absorb the sun's energy 148, thereby heating the cavity inside the clamshell 146 and causing the water to evaporate 150. Similar to the embodiment of FIG. 8A, the evaporated water 150 will condense on the inside of the clamshell 146 and drip down into the gutters 144. The water 152 which collects in the gutters may be reclaimed as potable water or used again in the drilling process or in some other industry. The embodiment of FIG. 8B has several advantages. First, it is solar powered, so it will not use non-renewable energy which reduces operating costs. Second, it does not take up additional footprint space when deployed, since it floats on the remaining water in the treatment area. Third, it does not need spray nozzles, which may clog over time.

Figure 8C:
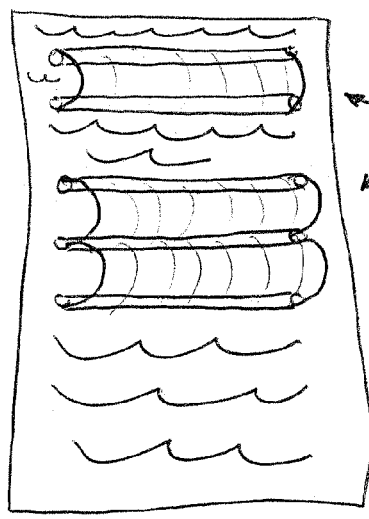
Figure 8D:
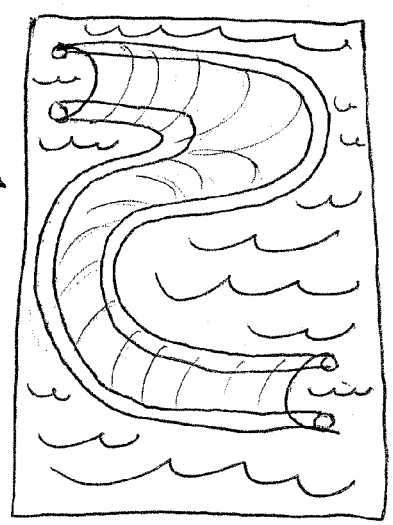

FIGS. 8A and 8B are cross-sectional views. FIGS. 8C and 8D show schematic top views of possible embodiments of the evaporating devices 104 based on the design of FIG. 8B. As can be seen, there is design flexibility to have the evaporating device 104 be single-clamshell or multi-clamshell. There is also the possibility to have the clamshell flexible so that the evaporating device may be snaked on top of the treatment area. The evaporating devices may be designed to be oriented a certain way relative to the sun in order to maximize their efficiency.

Figure 9:
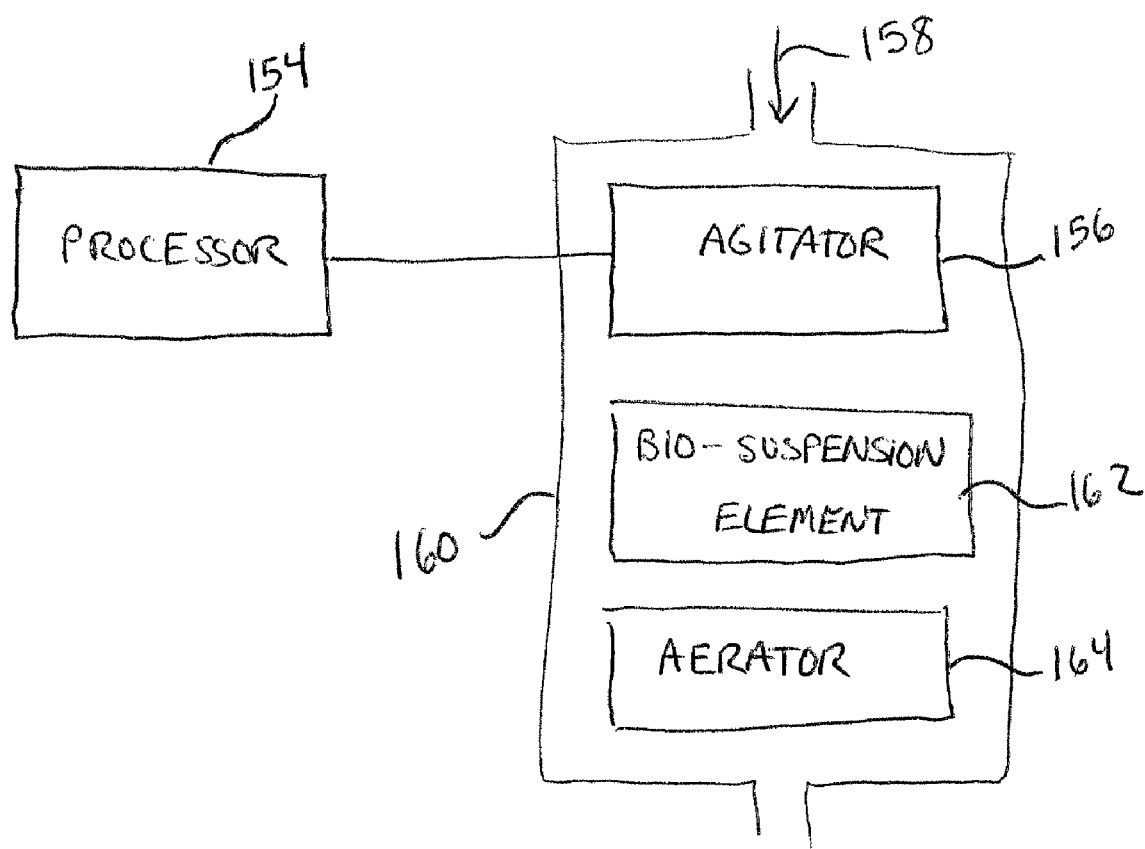
FIG. 9 schematically illustrates an embodiment of a bio-reactor.

Although the bio-reactor described herein has been discussed in terms of working with a drilling sludge recycling process, the bio-reactor may have usefulness in other applications needing to feed micro-organisms which do not involve oil. For example, a bio-reactor may also be useful in chemical, pharmaceutical, and paper-making industries. In that spirit, FIG. 9 schematically illustrates the bio-reactor of FIG. 4 on its own for the purpose of being able to claim it separately in a non-oil application. It is believed that the processor 154 coupled to the agitator 156 and configured to create at least a minimum self-cleaning drag force between a bio-food material 158 passing through the enclosed flow zone 160 and the combined at least one type of biological micro-organism and the at least one bio-suspension element 162 are unique. As above, an aerator 164 may be provided to optimize the biological process.

The advantages of a method and system to recycle drilling sludge have been discussed herein. Embodiments discussed have been described by way of example in this specification. It will be apparent to those skilled in the art that the forgoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. Additionally, the recited order of processing elements or sequences, or the use of numbers, letters, or other designations therefore, is not intended to limit the claims to any order, except as may be specified in the claims. Accordingly, the invention is limited only by the following claims and equivalents thereto.

What is claimed is:

1. A method of recycling drilling sludge, comprising:
   directing the drilling sludge to a treatment area;
   passing the drilling sludge from the treatment area through a salt-tolerant bio-reactor to reduce oil, sludge, and carbon compounds to produce remaining wastewater; and
   removing salt from the remaining wastewater.

2. The method of claim 1, wherein directing the drilling sludge to the treatment area comprises pumping the drilling sludge to the treatment area.

3. The method of claim 1, wherein directing the drilling sludge to the treatment area comprises delivering the drilling sludge to the treatment area by barrel.

4. The method of claim 1, wherein directing the drilling sludge to the treatment area comprises fluidically coupling a drilling area to the treatment area.

5. The method of claim 1, wherein the treatment area is selected from the group consisting of a lagoon, a land-based bladder, a floating bladder, a lined pond, a lined lake, and a storage tank.

6. The method of claim 1, wherein the salt-tolerant bio-reactor is located external to the treatment area.

7. The method of claim 1, wherein the salt-tolerant bio-reactor is located at least partially within the treatment area.

8. The method of claim 1, wherein the salt-tolerant bio-reactor comprises:
   at least one bio-suspension element for supporting the growth of at least one type of biological microorganism within an enclosed flow zone;
   an agitator for creating a flow of the drilling sludge through the enclosed flow zone at a flow rate; and
   an aerator for providing a gas to the enclosed flow zone.

9. The method of claim 8, wherein passing the drilling sludge through the salt-tolerant bio-reactor comprises creating at least a minimum self-cleaning drag force between the drilling sludge passing through the enclosed flow zone and the combined at least one type of biological microorganism and the at least one bio-suspension element.

10. The method of claim 9, wherein creating at least the minimum self-cleaning drag force comprises adjusting the flow rate.

11. The method of claim 9, wherein creating at least the minimum self-cleaning drag force comprises adjusting a cross-sectional area of the enclosed flow zone.

12. The method of claim 8, wherein the gas comprises oxygen.

13. The method of claim 8, further comprising introducing the at least one type of microorganism into the enclosed flow zone with the drilling sludge.

14. The method of claim 13, wherein the at least one type of microorganism is introduced into the enclosed flow zone intermittently.

15. The method of claim 1, wherein removing salt from the remaining wastewater comprises passing the remaining wastewater through a reverse osmosis filter to produce a first reclaimed water.

16. The method of claim 15, wherein removing salt from the remaining wastewater further comprises evaporating the remaining wastewater and collecting evaporated water through condensation to produce a second reclaimed wastewater.

17. The method of claim 1, wherein removing salt from the remaining wastewater comprises evaporating the remaining wastewater and collecting evaporated water through condensation to produce reclaimed wastewater.

18. The method of claim 17 wherein removing salt from the remaining wastewater further comprises removing heavy metals left behind with the salts after evaporation of the remaining wastewater.

19. The method of claim 1, further comprising separating inert solids from the drilling sludge.

20. The method of claim 1, wherein:
   the drilling sludge through the salt-tolerant bio-reactor produces a biomass; and
   the biomass or a sludge residue is run through a gasification reactor.

21. The method of claim 20, wherein toxins and heavy metals which remained in the biomass or the sludge residue prior to being run through the gasification reactor are encapsulated in glass as a result of the biomass or sludge residue being run through the gasification reactor.

22. The method of claim 21, wherein the glass is used as filler for concrete or road beds.

23. The method of claim 20, wherein heat or gases produced by the gasification reactor are used to generate electrical power.

24. The method of claim 23, wherein the generated electrical power is used at least in part to power the drilling process which generated the sludge residue.

25. The method of claim 23, wherein the generated electrical power is returned, at least in part, to an electrical grid.

26. A system for recycling drilling sludge, comprising:
   a) a treatment area; and
   b) a salt-tolerant bio-reactor, coupled to the treatment area, the bio-reactor comprising:
      i) at least one bio-suspension element for supporting the growth of at least one type of biological microorganism within an enclosed flow zone;
      ii) an agitator for creating a flow of the drilling sludge through the enclosed flow zone at a flow rate; and
      iii) an aerator for providing a gas to the enclosed flow zone; and
   c) a processor coupled to the agitator and configured to create at least a minimum self-cleaning drag force between drilling sludge passing through the enclosed flow zone and the combined at least one type of biological microorganism and the at least one bio-suspension element.

27. The system of claim 26, further comprising a drag force sensor configured to determine a current drag force between drilling sludge passing through the enclosed flow zone and the combined at least one type of biological microorganism and the at least one bio-suspension element.

28. The system of claim 26, further comprising a flow rate sensor configured to determine a flow rate of the drilling sludge through the enclosed flow zone.

29. The system of claim 26, wherein the processor is further configured to create at least the minimum self-cleaning drag force by adjusting the flow rate.

30. The system of claim 26, further comprising a cross-sectional area adjuster coupled to the enclosed flow zone and the processor, wherein the processor is further configured to create at least the minimum self-cleaning drag force by adjusting a cross-sectional area of the enclosed flow zone using the cross-sectional area adjuster.

31. The system of claim 26, wherein the gas comprises oxygen.

32. The system of claim 26, further comprising a microorganism dispenser configured to introduce the at least one type of microorganism into the enclosed flow zone with the drilling sludge.

33. The system of claim 32, wherein the dispenser is configured to introduce the at least one type of microorganism into the enclosed flow zone intermittently.

34. The system of claim 26, wherein the treatment area is selected from the group consisting of a lagoon, a land-based bladder, a floating bladder, a lined pond, a lined lake, and a storage tank.

35. The system of claim 26, wherein the salt-tolerant bio-reactor is configured to be located on a platform, on a boat, on a vehicle, or on land.

36. The system of claim 26, wherein the salt-tolerant bio-reactor is configured to be located at least partially in the drilling sludge in the treatment area.

37. The system of claim 26, wherein the treatment area is portable.

38. The system of claim 26, wherein the salt-tolerant bio-reactor is portable.

39. The system of claim 26 further comprising a reverse osmosis filter configured to reclaim water from treated drilling sludge after conversion of hydrocarbons in the drilling sludge to water, gas, and biomass energy.

40. The system of claim 39, wherein the reverse osmosis filter is portable.

41. The system of claim 26, further comprising a gasification reactor configured to convert sludge residue and biomass into energy for power generation.

42. The system of claim 26, further comprising an evaporation device configured to reclaim water from treated drilling sludge.

43. The system of claim 42, wherein the evaporation device comprises:

at least one condensation collection gutter;

a condensation surface; and a heat source for evaporating water from treated drilling sludge, such that the evaporated water condenses on the condensation surface, and runs into the at least one condensation gutter.

44. The system of claim 43, further comprising at least one float for helping the evaporation device to have a relatively steady position with regard to the height of the liquid surface within the treatment area.

45. The system of claim 43, wherein the heat source comprises a solar energy absorbing surface.

46. The system of claim 45, wherein the condensation surface comprises the solar energy absorbing surface.

47. The system of claim 43, wherein the heat source comprises a heater.

48. A bio-reactor, comprising:

at least one bio-suspension element for supporting the growth of at least one type of biological microorganism within an enclosed flow zone;

an agitator for creating a flow of a bio-food through the enclosed flow zone at a flow rate;

an aerator for providing a gas to the enclosed flow zone; and a processor coupled to the agitator and configured to create at least a minimum self-cleaning drag force between bio-food passing through the enclosed flow zone and the combined at least one type of biological microorganism and the at least one bio-suspension element.

49. The bio-reactor of claim 48, further comprising a microorganism dispenser configured to introduce the at least one type of microorganism into the enclosed flow zone with the bio-food.

50. The system of claim 49, wherein the dispenser is configured to introduce the at least one type of microorganism into the enclosed flow zone intermittently.

51. The system of claim 48, further comprising a drag force sensor coupled to the enclosed flow zone for measuring a current drag force.

52. The system of claim 51, wherein:

the processor is further configured to monitor the current drag force from the drag force sensor; and increase the flow from the agitator if the current drag force is less than the minimum self-cleaning drag force.

* * * * *